March 5, 1968     B. M. PAUL     3,371,423
MEASURING DEVICE FOR MARKING FASTENERS
Filed June 1, 1966
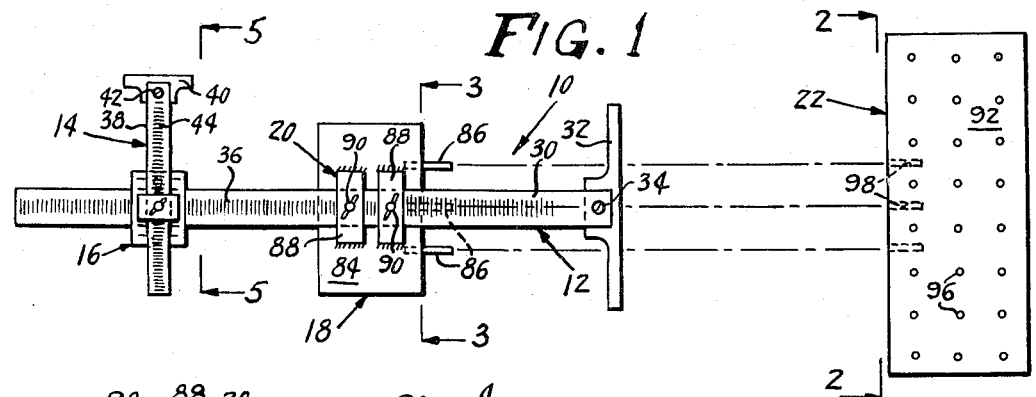
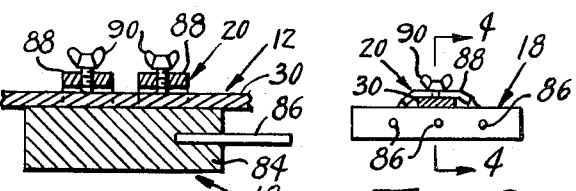 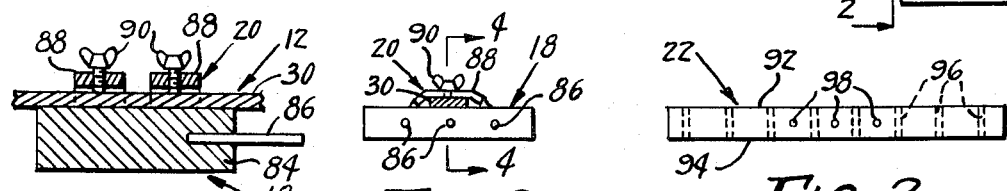
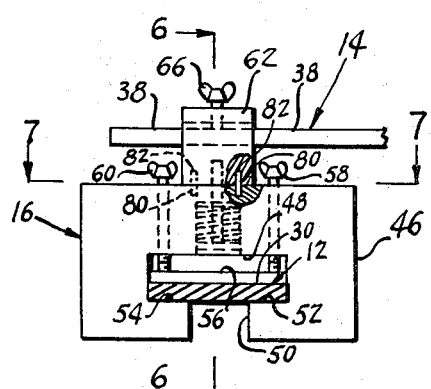 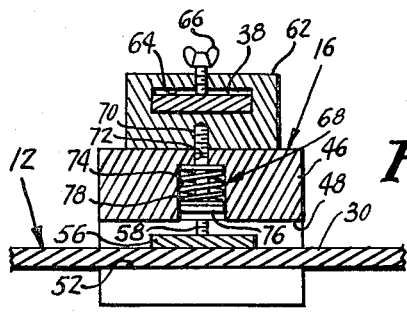
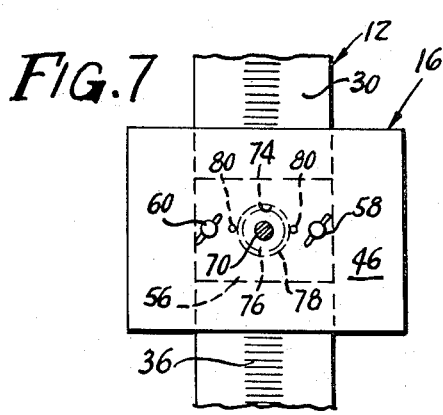 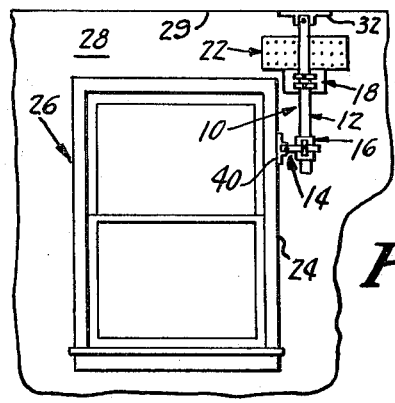
INVENTOR.
BRYANT M. PAUL
BY Kimmel, Crowell & Weaver
ATTORNEYS.

United States Patent Office 3,371,423
Patented Mar. 5, 1968

3,371,423
MEASURING DEVICE FOR MARKING FASTENERS
Bryant M. Paul, North Highlands, Calif.
(6830 Silverthorne Circle, Sacramento, Calif. 95842)
Filed June 1, 1966, Ser. No. 554,405
8 Claims. (Cl. 33—189)

This invention relates to a measuring device, and more particularly to a device for marking a point for the installation of fasteners such as is required when hanging drapes around a window although it should be understood that the device of the instant invention may be used in many different marking operations.

One profitable endeavor to which the instant invention may be applied is the positioning of drapery or curtain brackets adajcent a window. In the hanging of curtains or drapery adjacent a window, it is necessary first to position the rod receiving brackets accurately with respect to the window frame. This is done in the prior art by measuring, with a tape or the like, a given distance laterally of the window frame and then measuring vertically upwardly a distance sufficient to place the bracket high enough to accommodate curtains of desired length. It is readily apparent that this is a slow means of accurately positioning drapery brackets.

In brief terms, the instant invention comprises an alignment bar adapted to be placed flush against the side of a window, an elongate bar extending parallel to the window frame and means on the elongate bar forming a plurality of apertures through which the position for the bracket fasteners may be marked. When the measuring device of the instant invention is placed beside a window, a pencil or other suitable marking element may be used to inscribe a dot on the wall where the bracket fasteners will be positioned. It is apparent that the marking element may be a drill inserted through the apertures to form a pilot hole for receiving the bracket fasteners.

It is an object of the instant invention to provide a measuring device which may be used to fix a point on a surface bounded by horizontal and vertical edges.

Another object of the instant invention is to provide a measuring device comprised of an alignment bar adapted to be positioned flush against a planar surface, en elongate bar perpendicular to the alignment bar carrying means for abutting a perpendicular planar surface and means intermediate the ends of the elongate bar forming apertures through which a desired point may be inscribed on an underlying surface.

A further object of the instant invention is to provide a measuring device particularly adapted for quickly and conveniently positioning a curtain rod bracket adjacent a window.

A still further object of the instant invention is to provide a measuring device comprised of an elongate bar, an alignment bar perpendicular to the elongate bar and movably mounted thereon, the aligment bar being arranged for selectively residing on opposite sides of the elongate bar.

Still another object of the instant invention is to provide a device for positioning a curtain rod bracket adjacent a window comprised of an alignment bar adapted to be positioned against the window frame, an elongate bar perpendicular to the alignment bar carrying means for perpendicularly abutting the ceiling of the room and means intermediate the ends of the elongate bar forming apertures through which a desired point may be inscribed on the wall thereby fixing the location of the bracket.

Other objects and advantages of the instant invention reside in the combinations of elements, arrangements of parts and features of construction and utilization, all as will be more fully pointed out hereinafter and disclosed in the accompanying drawing wherein there is shown a preferred embodiment of this inventive concept.

In the drawings:

FIGURE 1 is a top plan view of the measuring device of the instant invention illustrating the marking plate separated from the remainder of the device;

FIGURE 2 is an end elevational view of the marking plate of FIGURE 1 as seen from along line 2—2 thereof as viewed in the direction indicated by the arrows;

FIGURE 3 is a transverse cross-sectional view of the measuring device of FIGURE 1 taken substantially along line 3—3 thereof as viewed in the direction indicated by the arrows;

FIGURE 4 is a longitudinal cross-sectional view of the device of FIGURES 1 and 3, taken substantially along line 4—4 of FIGURE 3 as viewed in the direction indicated by the arrows;

FIGURE 5 is an enlarged cross-sectional view of the device of FIGURE 1 taken substantially along line 5—5 thereof as viewed in the direction indicated by the arrows;

FIGURE 6 is an enlarged longitudinal cross-sectional view of the measuring device of FIGURES 1 and 5, taken substantially along line 6—6 of FIGURE 5 as viewed in the direction indicated by the arrows;

FIGURE 7 is a cross-sectional view of the measuring device of the instant invention taken substantially along line 7—7 of FIGURE 5 as viewed in the direction indicated by the arrows; and FIGURE 8 is a front elevational view of a window and the measuring device of the instant invention illustrating the operative position of the measuring device.

Referring now to the drawing in detail, wherein like reference characters designate like elements throughout the several views thereof, the measuring device of the instant invention is shown generally at 10 comprised of a T-square designated generally at 12, an alignment bar denominated generally at 14 movably mounted on T-square 12 by a mounting means designated generally at 16, a support shown generally at 18 movably mounted on T-square 12 by a mounting means denominated generally at 20 and a marking plate designated generally at 22 arranged for securement with support 18. As shown in FIGURE 8, alignment bar 14 is placed against a frame 24 of a window shown generally at 26 extending through a wall 28 with the upper edge of T-square 12 abutting the ceiling 29 of the room. In the use of measuring device 10, the desired point of attachment of a hanger bracket to wall 28 is calculated from the length and width of the curtains to be installed. For example, assuming that window 26 is 58 inches wide and 70 inches long, the curtains to be installed are 70 inches wide and 80 inches long, and it is desired for the lower edge of the curtain to be parallel with the bottom of the window, it will be readily seen that the center of the bracket should be approximately ten inches above the top of window 26 and spaced about six inches from the lateral edge of frame 24. Since alignment bar 14 is calibrated and since the apertures in marking plate 22 are preferably spaced predetermined distances from the axis of T-square 12, a particular aperture in plate 22 may be accurately positioned a predetermined distance, for example six inches, laterally of window frame 24, thereby providing the correct lateral spacing of the hanger bracket. Since T-square 12 is provided with suitable measuring indicia thereon as shown in FIGURE 1, the particular aperture through which the mark on wall 28 is to be inscribed may be correctly positioned a predetermined distance below ceiling 29 thereby appropriately positioning the location for the bracket fasteners.

Referring now to FIGURE 1, T-square 12 preferably includes an elongate bar 30 having a perpendicular cross piece 32 secured thereon by a suitable fastener 34 with a plurality of measuring indicia 36 designating the distance between each of the measuring indicia and the end of cross piece 32.

Alignment bar 14 is illustrated as a miniature T-square having an elongate bar 38 carrying a cross piece 40 secured thereon by a suitable fastener 42. A plurality of measuring indicia 44 act to measure the distance from each indicia to the end of cross piece 44 in much the same manner that indicia 36 act with respect to T-square 12. As shown best in FIGURES 5 and 6, elongate bar 38 of alignment means 14 adjustably received by mounting means 16 for movement in a plane perpendicular to elongate bar 30. Mounting means 16 includes a substantially C-shaped block 46 forming an interior passageway 48 communicating with the exterior of block 46 through a central perpendicular slot 50 thereby forming a pair of ledges 52, 54. Bar 30 of T-square 12 rests on ledges 52, 54 and underlies a vertically movable plate 56 connected to a pair of wing screws 58, 60 threadably extending through block 46 into passageway 48. The interconnection between the lower ends of screws 58, 60 and plate 56 is freely rotatable while acting to retain plate 56 on the ends of screws 58, 60 such as may be provided by a ball-retaining socket arrangement (not shown). It will be readily apparent that wing screws 58, 60 may be advanced to press movable plate 56 against bar 30 thereby adjustably securing mounting means 16 to T-square 12.

In continuing reference to FIGURES 5 and 6, mounting means 16 includes an alignment bar retaining block 62 forming a central passageway 64 receiving bar 38 of alignment means 14 with a wing screw 66 adjustably fixedly securing bar 38 in passageway 64. Block 62 is operatively connected with block 46 by a selectively rotatable connection shown generally at 68. Connection 68 includes a screw 70 secured to block 62 and freely rotatably received in an aperture 72 in block 46 communicating with a lower enlarged cavity 74. A head 76 is affixed on the lower end of screw 70 and is biased downwardly by a spring 78. As shown in FIGURE 6, the lowermost end of cavity 74 is of reduced diameter thereby preventing the loss of head 76 therethrough.

It will readily be seen that connection 68 affixes blocks 46, 62 together and yet allows rotative movement therebetween. As shown best in FIGURE 5, a pair of pins 80 are fixedly secured to block 46 in upstanding relation and are spaced 180° apart. Pins 80 are removably received in blind orifices 82 formed in the bottom of block 62. It will be readily apparent that an individual may grasp block 62 and pull blocks 46, 62 apart against the forces produced by spring 78. When pins 80 clear orifices 82, block 62 may be rotated 180°. When block 62 is released, pins 80, 82 will re-engage thereby positioning alignment bar 14 on the opposite side of T-square 12. This is of considerable importance since it allows a single device to be used when measuring opposite sides of a window. As exemplary of the advantages of mounting means 16, reference is made to FIGURE 8 where it is assumed that marking plate 22 is affixed at the appropriate position for marking the location of the hanger bracket. When the other side of the window is desired to be marked, block 62 need only be raised and rotated 180° followed by placing measuring device 10 on the opposite side of the window.

Referring now to FIGURES 1 to 3 inclusive, support 18 includes a substantially rectangular structure 84 carrying a plurality of spaced apart pins 86 extending toward cross piece 32 of T-square 12. As will be more fully pointed out hereinafter, pins 86 act as a first portion of a connecting means securing plate 22 to support 18. Support 18 is mounted for movement parallel to the longitudinal axis of T-square 12 by mounting means 20 which comprise a pair of substantially U-shaped straps 88 secured to structure 84 in any convenient manner as by welding or the like. Elongate bar 30 of T-square 12 is received between straps 88 and structure 84 with a wing screw 90 extending through strap 88 for adjustably fixedly securing support 18 and T-square 12 together.

Referring now to FIGURES 1 and 2, measuring block 22 is illustrated as a rectangular block of material having a pair of parallel faces 92, 94 forming a plurality of apertures 96 perpendicular to faces 92, 94 and extending through mounting plate 22. Plate 22 also forms a plurality of transverse apertures 98 constituting a second portion of the connecting means securing support 18 to plate 22. Apertures 94 are positioned such that face 92 will reside flush against the bottom of elongated bar 30 of T-square 12. An important feature of the instant invention is that plate 22 is of suffient thickness such that when measuring device 10 is placed against a planar surface, such as wall 28, second face 94 positions elongate bar 30 parallel to the planar surface.

Since apertures 96 are preferably spaced a predetermined distance from the longitudinal axis of T-square 12, it will be seen that an operator can readily measure lateral distances from an extension of window frame 24 thereby properly positioning a bracket. It should be pointed out that a plurality of different measuring plates may be provided having apertures in different configurations to increase the flexability of use.

It is now seen that there is herein provided an improved measuring device which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. A measuring device comprising:
 a straight elongate bar having a longitudinal axis and an end perpendicular to the axis;
 an alignment bar, extending away from the elongate bar, having a flat surface parallel to the axis;
 means mounting the alignment bar on the elongate bar positioning the flat surface parallel to the axis;
 a measuring plate having a pair of parallel first and second planar faces and at least one aperture perpendicular to the faces for receiving a marking element; and
 means mounting the measuring plate on the elongate bar between the alignment bar and the perpendicular end for movement parallel to the axis, the first face of the measuring plate residing flush against the elongate bar, the second face being spaced from the bar at least as far as any other element of the device so that when the second face abuts a planar surface the second face positions the elongate bar parallel to the planar surface.

2. The measuring device of claim 1 wherein the alignment bar mounting means includes means for selectively rotating the alignment bar 180°.

3. The measuring device of claim 2 wherein the alignment bar mounting means includes means adjustably mounting the alignment bar for movement parallel to the axis of the elongate bar.

4. The measuring device of claim 2 wherein
 the alignment bar adjusting means includes a block operatively engaged with the elongate bar and a block operatively engaged with the alignment bar, the blocks being juxtaposed;
 the selective rotary means includes
  opposing male and female members on the blocks; and
  means biasing the blocks together engaging the male and female members precluding inadvertent rotative movement.

5. The measuring device of claim 4 wherein the male and female members comprise a pair of pins spaced 180° apart and a pair of apertures spaced 180° apart.

6. The measuring device of claim 4 wherein one of the blocks forms an enlarged cavity communicating to a point adajacent the other block through a non-threaded opening, and wherein the biasing means includes a pin, in the cavity extending through the opening, fixedly secured to the other block;

a head, in the cavity, on the end of the pin; and a spring, in the cavity surrounding at least a portion of the pin, biasing the head away from the opening.

7. The measuring device of claim 1 wherein the measuring plate forms a plurality of apertures at least some of which lie beyond the edges of the elongate bar.

8. The measuring device of claim 7 wherein the apertures are small and circular for conveniently receiving the marking element.

References Cited

UNITED STATES PATENTS

| | | | |
|---|---|---|---|
| 986,772 | 3/1911 | Simpson | 33—120 |
| 2,303,117 | 11/1942 | Exline | 33—189 |
| 2,592,877 | 4/1952 | Ellington | 33—189 |
| 3,246,399 | 4/1966 | Southern | 33—189 |

WILLIAM D. MARTIN, JR., *Primary Examiner.*

LEONARD FORMAN, *Examiner.*